Figure 1:
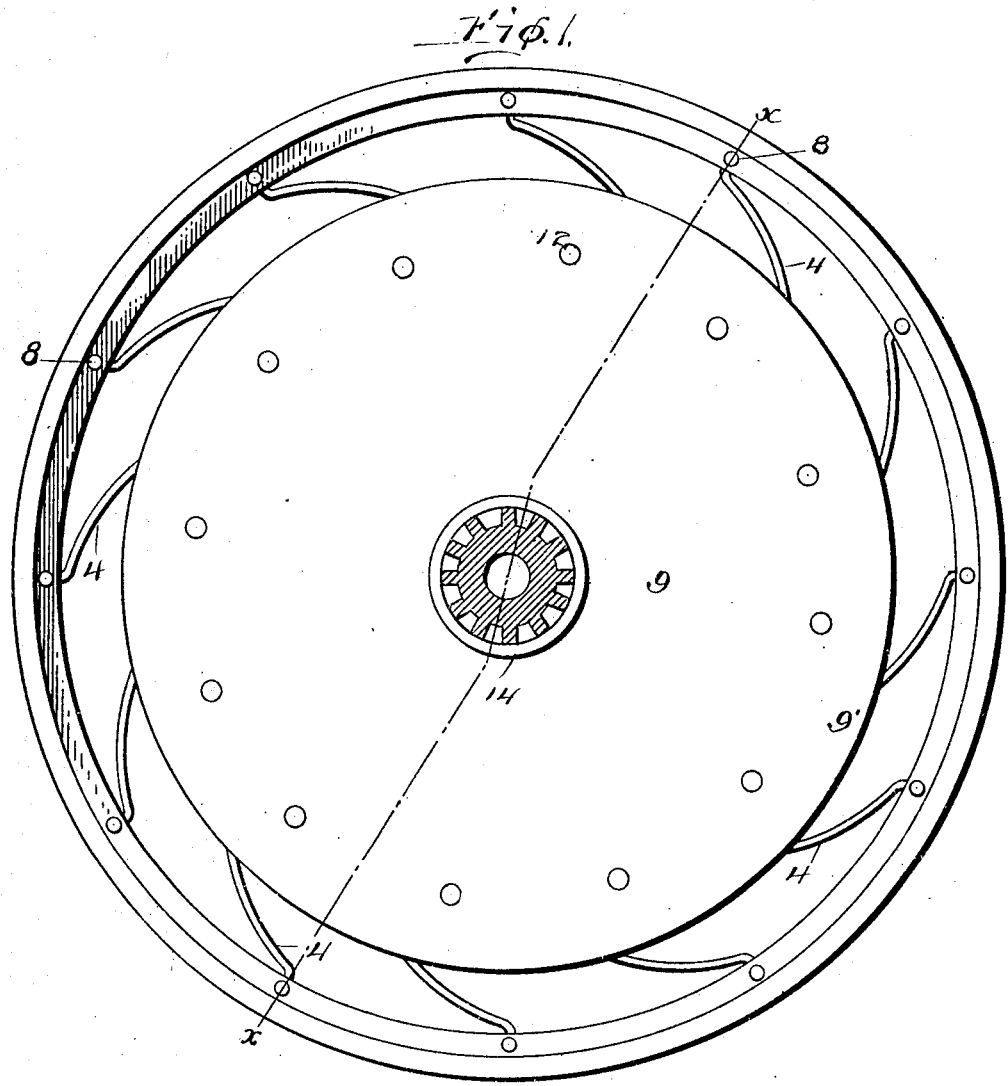

W. J. DOYLE.
VEHICLE WHEEL.
APPLICATION FILED APR. 17, 1908.

916,122.

Patented Mar. 23, 1909.
3 SHEETS—SHEET 1.

W. J. DOYLE.
VEHICLE WHEEL.
APPLICATION FILED APR. 17, 1908.
916,122.
Patented Mar. 23, 1909.
3 SHEETS—SHEET 2.
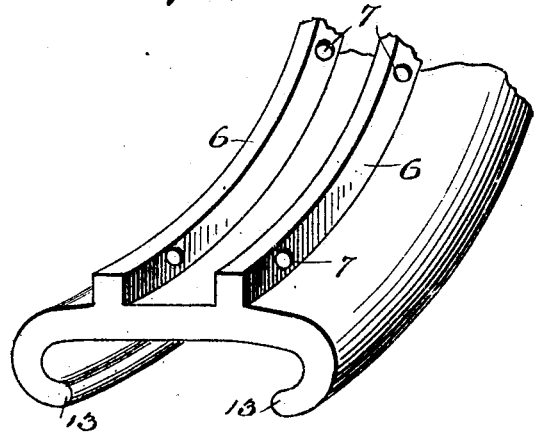
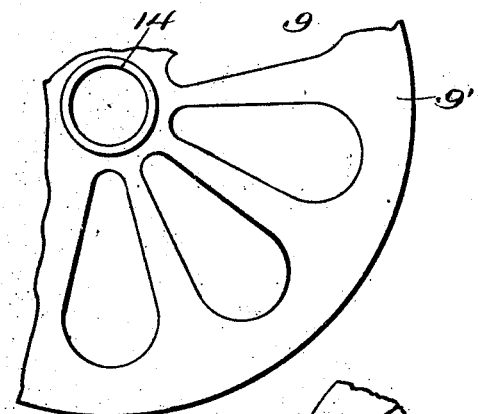
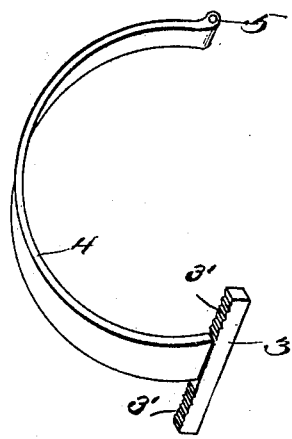
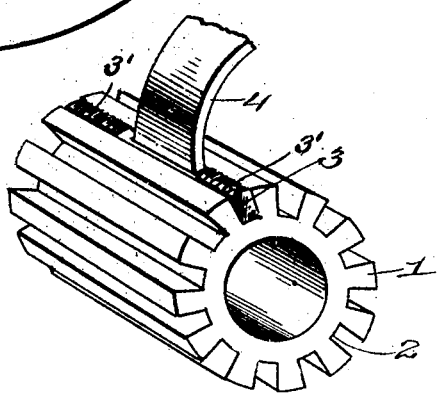
Inventor
William J. Doyle
Witnesses

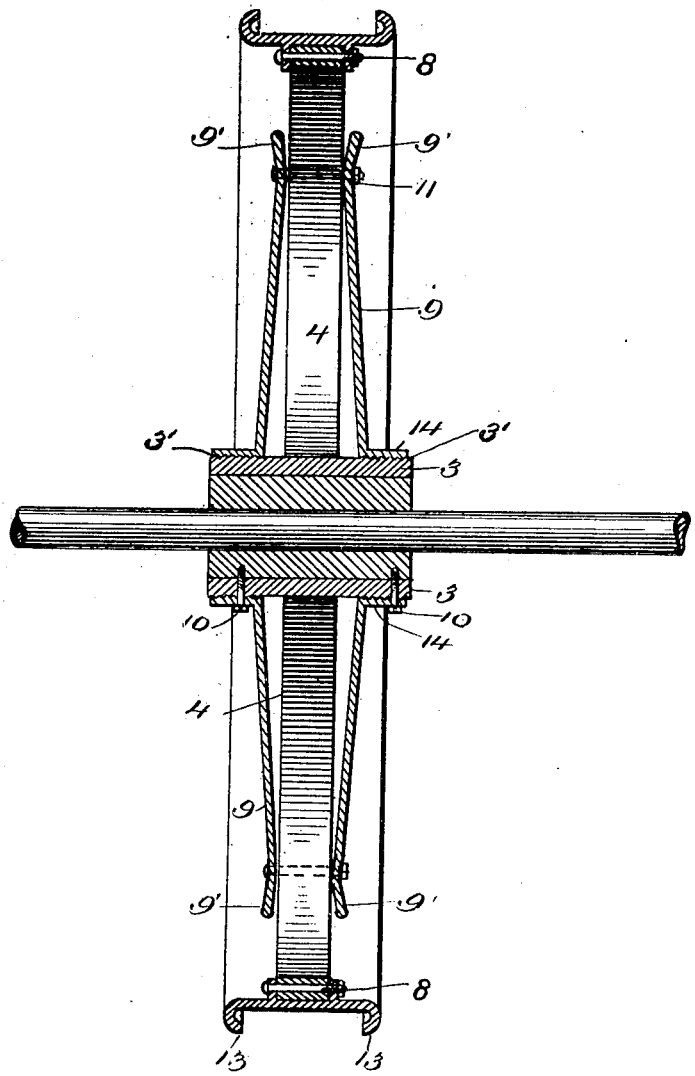

UNITED STATES PATENT OFFICE.

WILLIAM J. DOYLE, OF EVANSTON, ILLINOIS, ASSIGNOR OF ONE-HALF TO JOHN M. COLLINS, OF CHICAGO, ILLINOIS.

VEHICLE-WHEEL.

No. 916,122.      Specification of Letters Patent.      Patented March 23, 1909.

Application filed April 17, 1908. Serial No. 427,698.

*To all whom it may concern:*

Be it known that I, WILLIAM J. DOYLE, a citizen of the United States, residing at Evanston, in the county of Cook and State of Illinois, have invented certain new and useful Improvements in Vehicle-Wheels, of which the following is a specification.

My invention relates to improvements in vehicle wheels, and it consists in the construction and arrangement of parts, as will be hereinafter described and particularly pointed out in the claims.

In the accompanying drawings Figure 1 is a side elevation of my improved wheel. Fig. 2 is a detail view of one of the spokes. Fig. 3 is an enlarged view in perspective of the hub, said hub also showing one of the spokes attached thereto. Fig. 4 is a sectional view of the inner face of the rim. Fig. 5 is a transverse section of the wheel taken through the line $x$—$x$, Fig. 1. Fig. 6 shows another form of disk or plate broken away with open work.

The wheel is composed of metal, except the tire, which may be made of inflated rubber tube or of solid rubber, as desired. The hub, as shown in Fig. 3, is provided with surrounding peripheral ribs 1, projecting radially therefrom and having openings or spaces 2 therebetween for a purpose presently to be explained.

The spokes, one of which is shown in Fig. 2, are preferably composed of a flat strip of elastic steel which is bent into an arc-shaped form and integrally united at one of its ends to the central portion of a cross-bar 3, which corresponds in shape and form with the openings or spaces 2 between the ribs 1 of the hub. Said cross-bar 3 is provided on its upper edge with screw threads 3', arranged on the opposite sides of the united end of the spoke. The outer or opposite end of the spoke is enlarged, as shown at 4, and is provided with a bolt-hole 5. The rim of the wheel, as shown in reverse section, Fig. 4, is provided on its inner face with a pair of longitudinally extending ribs 6, which are spaced apart a sufficient distance to accommodate between them the enlarged end 4 of the spoke, and said ribs are provided with suitable bolt openings which register with the bolt holes 5 of the enlarged end 4 of the spoke, and through these holes 5 and 7 are inserted bolts 8, on the ends of which are applied nuts whereby the enlarged ends of the spokes are secured to the rim of the wheel, as shown in Fig. 5. Disks or plates 9, having a central opening therein, which is encircled by an outwardly extending collar or sleeve 14 (shown in section, Fig. 5), said collar or sleeve being interiorly screw-threaded to permit of its being connected to the screw-threads of the cross-bar 3 and over the peripheral edges of the ribs 1 of the hub, which serves to hold the cross-head within the openings 2 of the ribs 1. Besides securing the collars 14 of the plates or disks 9 to the cross-bars of the spokes I preferably employ set-screws 10, as shown in Fig. 5, which are inserted in screw openings of the collars, ribs, and hub. The plates or disks 9 are inclined upwardly from their sleeve portions 14, and are spaced from the spokes 4, and the surrounding marginal portion of each plate or disk is constructed flaring, as shown at 9', Fig. 5, and adjacent to said flaring portion bolts 11 are inserted therethrough so as to hold the disks in proper position and away from the spokes, whereby the spokes are permitted to have play between the disks, the bolts 11, serving as a bearing for the spokes during the rotation of the wheel.

I wish it to be understood that I do not confine myself to the exact construction of the spokes shown, as I may vary the same without departing from the essential features of my invention or the true principle thereof.

Having described my invention, what I claim is:

1. A wheel comprising a hub with radial spaced-apart ribs which extend continuously across the peripheral portion of the hub, spring spokes having secured at one end thereof the central portion of a screw-threaded cross-bar, said bar being mounted within the space between the ribs, inwardly inclined plates or disks having internally screw-threaded sleeves therewith, said sleeves adapted to be connected to the threads of the cross-bar and over the ribs of the hub, means for securing the sleeves, rib, and hub together, means for securing the marginal portions of the disks in position on opposite sides of the spoke, the outer end of the spoke having a bearing to connect with the rim of the wheel, substantially as specified.

2. A vehicle-wheel comprising a hub with radial spaced-apart ribs which extend continuously across the peripheral portion of the hub, spring spokes having secured at one end thereof the central portion of a screw-threaded cross-bar, said bar being mounted within the space between the ribs, inwardly inclined disks or plates having internally screw-threaded sleeves therewith, said sleeves adapted to be connected to the threads of the cross-bar and over the ribs of the hub, bolts for securing the sleeves, rib, and hub together, said disks having marginal flaring portions, bolts inserted through the disks adjacent the flaring portions of the same, the opposite or outer ends of the spokes having bearings to secure the same between the rim of the wheel, substantially as specified.

In testimony whereof I do affix my signature in the presence of two witnesses.

WILLIAM J. DOYLE.

Witnesses:
R. A. BURTON,
ROSE DELLHEIM.